June 10, 1930.  F. S. ROBSON  1,763,481
LAWN MOWER SHARPENER
Filed Sept. 19, 1928  3 Sheets-Sheet 1

Frank S. Robson,
INVENTOR

BY
ATTORNEY

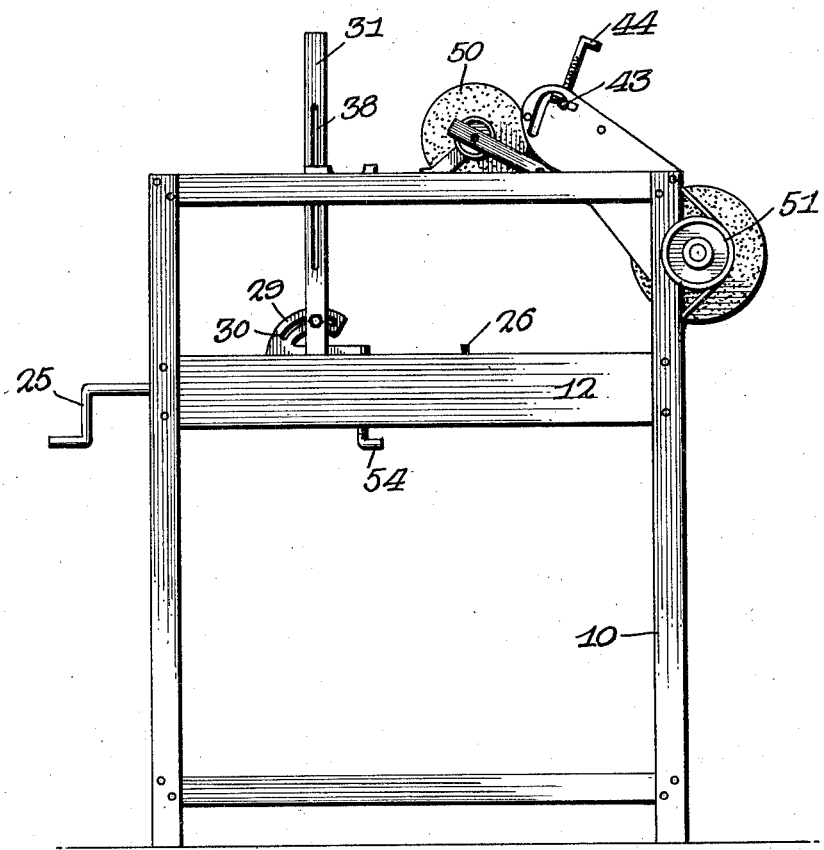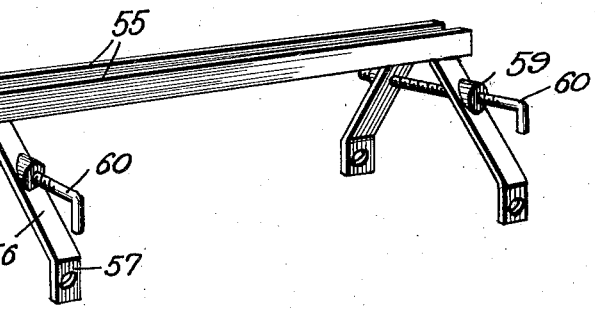

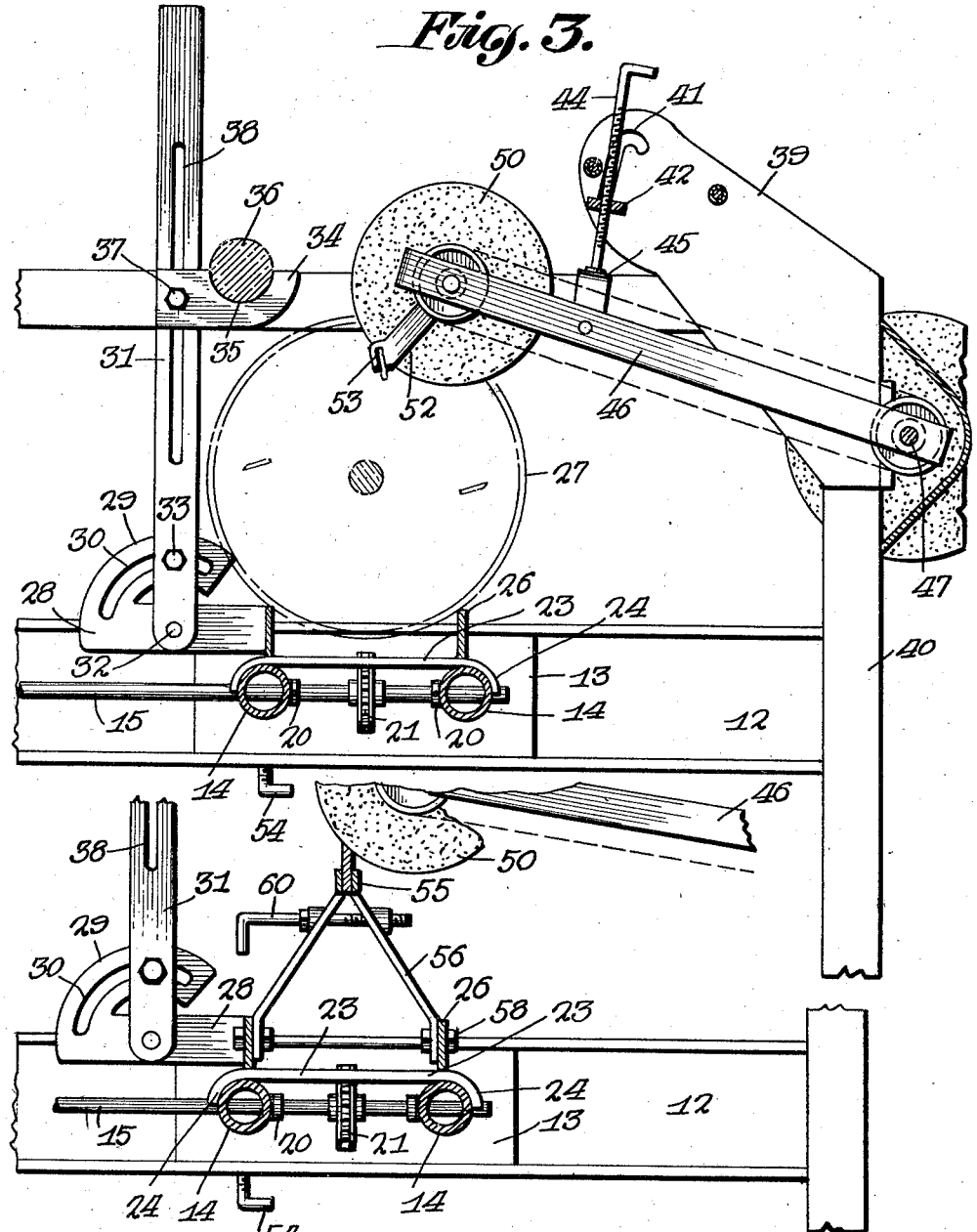

Patented June 10, 1930

1,763,481

UNITED STATES PATENT OFFICE

FRANK SCOTT ROBSON, OF BASALT, IDAHO

LAWN-MOWER SHARPENER

Application filed September 19, 1928. Serial No. 306,886.

This invention relates to sharpening devices primarily adapted for use upon and in conjunction with lawn mowers, two man cross cut saws etc.

An object of the invention comprehends a traveling carriage for the work by means of which the same may be shifted toward and away from the sharpener.

Another object of the invention contemplates a depth gauge for the sharpener.

An additional object of the invention resides in the provision of a holding element for the mower whereby the blades therefor may be disposed in desired positions.

With the above and other objects in view, the invention further consists in the following novel features and details of construction, to be hereinafter more fully described, illustrated in the accompanying drawings and pointed out in the appended claims.

In the drawings:—

Figure 2 is an end elevation of the invention.

Figure 3 is a fragmentary horizontal sectional view taken through the invention.

Figure 4 is a perspective view of a blade holder for the stationary blade of the lawn mower, saw blade etc.

Figure 5 is a view similar to Figure 3 illustrating the disposition of the holding element.

Figure 1:
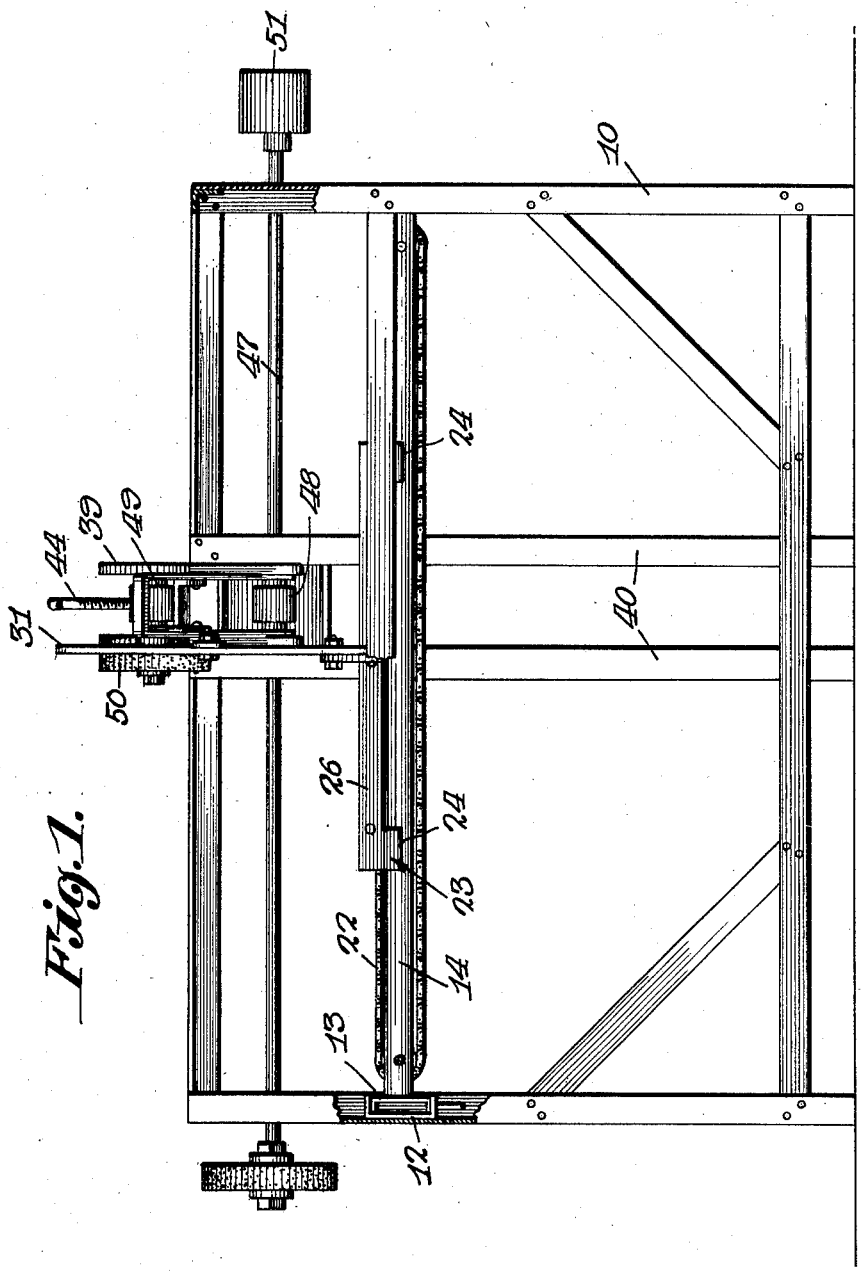
Figure 1 is a front elevation of the invention partly broken away to illustrate the construction thereof.

Referring to the drawings in detail, wherein like characters of reference denote corresponding parts, the reference character 10 indicates generally a frame of elongated configuration and formed of angle bar sections.

Channel bars 12, horizontally disposed between the end legs of the frame, are adapted to accommodate sliding channel bars 13 within the inner sides thereof.

Tubular members 14, disposed in spaced parallel relation and having connection at their ends with the adjacent portions of the slidably mounted channel bars 13, are adapted to receive the innermost ends of right angularly disposed operating rods 15 extended within registering openings therein. Stop collars 20, carried upon the inner portions of the operating rods 15 between the tubular members 14, are adapted to prevent accidental displacement of said rods in either direction. Sprocket wheels 21 are fixed upon the operating shafts 15 between the tubular members 14 having trained thereover a sprocket chain 22. A carriage plate 23, seated upon the upper sides of the tubular members 14, terminates to provide upon the side edges thereof with down-turned edges 24 conforming in shape to the outer side wall contour of the tubular members 14 whereby lateral shifting movement of the carriage plate will be prevented. The extremities of the socket chain 22 are adapted for connection with the ends of the carriage plate 23 to impart lateral shifting or oscillatory movement thereto when the crank portions 25 formed upon the outermost ends of the operating shafts 15 are rotated. Fins 26, upstanding from the upper side of the carriage plate 23 in spaced parallelism, are adapted to engage the mower wheels 27 in the manner as best illustrated in Figure 3 of the drawings.

An arm 28, outwardly projected from the foremost of the fins 26, terminates to provide an upwardly, rearwardly and downwardly curved extremity 29 having an arcuate-shaped slot 30 therein, the purpose of which will be presently apparent.

A standard 31, pivotally mounted adjacent its lowermost end, as indicated at 32, upon the arm 28, receives an adjusting bolt 33 passed through the arcuate-shaped slot 30. The bolt 33 will facilitate adjustment of the standard 31 toward and away from the blades and wheels of the mower.

A holding arm 34, having a semi-circular cut-out portion 35 within the upper side of the innermost projecting end thereof, is adapted to accommodate and support the mower roller 36, whereby the mower may be sustained in a nearly inverted position. A fastening element 37, passed through the opposite end of the holding arm 34, is also extended within an elongated longitudinally disposed slotted portion 38 adjacent the uppermost end of the standard 31, whereby mowers of different sizes may be held in positions desired.

Spaced plate members 39, carried upon the inner sides and adjacent the uppermost ends of intermediate supporting legs 40 for the frame 10, are provided with registering bayonet slots 41 adjacent the free ends thereof.

A plate member 42, having trunnions 43 outwardly projecting from the ends thereof, are adapted for reception within the bayonet slots 41. A tension regulating shaft 44, threaded within the plate 42, is adapted for swivel connection with a yoke member 45 pivotally mounted between the walls of a looped yoke 46. A line shaft 47, carried upon the frame 10, is provided with a pulley wheel 48 at an appropriate point in the length thereof and over which a belt or other endless connector is passed from a pulley wheel 49 journaled between the foremost end of the loop yoke 46. An emery wheel 50, fixed upon the shaft for the pulley wheel 49, is adapted to be moved toward and away from the spiraled rotary blades of the lawn mower by the shaft 44, whereby the desired depth may be predetermined and all blades cut to the same depth. It is further to be noted that the operating shafts 15 and standard 31 also afford adjustment to the mower while disposing the blades therefor adjacent the emery wheel 50, whereby the desired angle and cutting depth may be set.

After the mower has been inverted in the position shown in Figure 3 of the drawings, upon the flange members 26, mounted upon the carriage plate 23, and the aforementioned adjustments executed, the emery wheel 50 is rotated by a source of current suitably connected with a pulley wheel 51 included upon one end of the line shaft 47.

A guide arm 52, carried by the looped yoke 46, is provided with a pocket 53 within which the spiraled movable blades of the mower are inserted. The operating shafts 15 are then called into use to oscillate the mower backwards and forwards across the frame until the emery wheel ceases to cut any deeper upon the particular blade. The mower is then left in the same position and the tension regulating shaft 44 is then grasped and elevated to dispose the trunnions 43 upon the ends of the plate member 42 within the goose neck extremities of the bayonet slots 41, substantially as illustrated in Figure 2 of the drawings, whereby the next succeeding mower blade may be positioned within the pocket 53 in the arm 52. Set screws 54, carried by the channel members 12, are adapted for biting engagement with the channel members 13, whereby displacement of the tubular members 14 will be prevented.

When sharpening the stationary blades of lawn mowers, two-man cross cut saws etc., a supporting apparatus in the nature of parallel bars 55 are employed to engage the opposite side edges thereof, whereby the cutting edge of the particular blade may be exposed to the emery wheel. Legs 56, downwardly, outwardly, and obliquely disposed upon the lower side edges of the bars 55, terminate to provide depending apertured ears 57 adapted to accommodate fastening elements 58 passed through the flanges 26 upstanding from the carriage plate 23.

Interiorly threaded sleeve members 59, carried upon the outer sides of the legs 56, are adapted for threaded engagement with the tapped portions of adjusting bars 60, which regulate the space and grip between the bars or jaws 55, whereby the particular blade may be rigidly retained against displacement while being oscillated across the frame during the sharpening operation.

The invention is susceptible of various changes in its form, proportions and minor details of construction, and the right is herein reserved to make such changes as properly fall within the scope of the appended claims.

Having thus described the invention, what is claimed is:—

1. A sharpening machine comprising a frame having a line shaft, slides carried thereby, tubular members mounted upon the slides at the ends of the frame, a carriage plate having flanges slidably mounted upon the tubular members, an operating mechanism carried by the tubular members and having connection with the carriage plate to oscillate same across the frame, a sharpening element driven by the line shaft, an adjusting element adapted to regulate tension of the element with relation to the blades of the work, and an arm having a pocket within one end adapted to accommodate said blades whereby the latter may be angularly disposed with relation to said sharpening element.

2. A sharpening machine comprising a frame having a line shaft, slides carried thereby, tubular members mounted upon the slides at the ends of the frame, a carriage plate having flanges slidably mounted upon the tubular members, an operating mechanism carried by the tubular members and having connection with the carriage plate to oscillate same across the frame, a sharpening element driven by the line shaft, an adjusting element adapted to regulate tension of the sharpening element with relation to the blades of the work, an arm having a pocket within one end adapted to accommodate said blades whereby the latter may be angularly disposed with relation to said sharpening element, and a work supporting apparatus included upon said flanges operable in conjunction with said blade engaging arm.

In testimony whereof I affix my signature.

FRANK SCOTT ROBSON.